Nov. 4, 1969
V. R. HUBER ET AL
3,476,168
DUAL CHAMBERED TIRE VALVE
Filed May 23, 1967
2 Sheets-Sheet 1
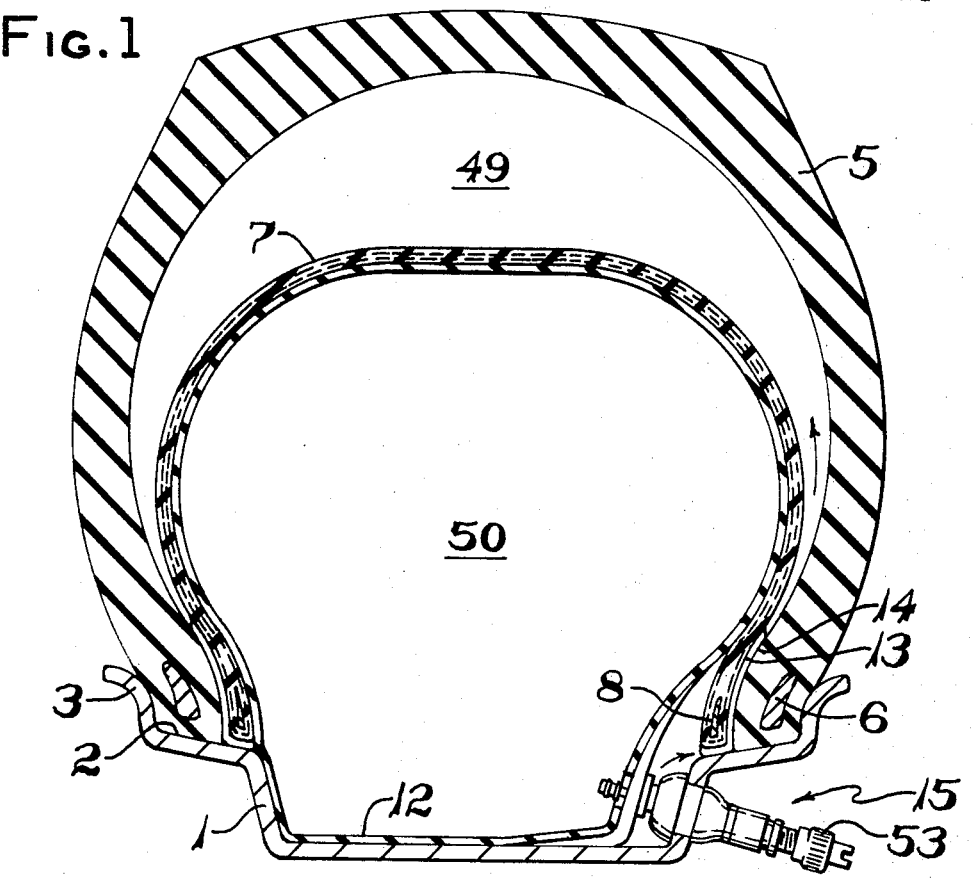
Fig. 1
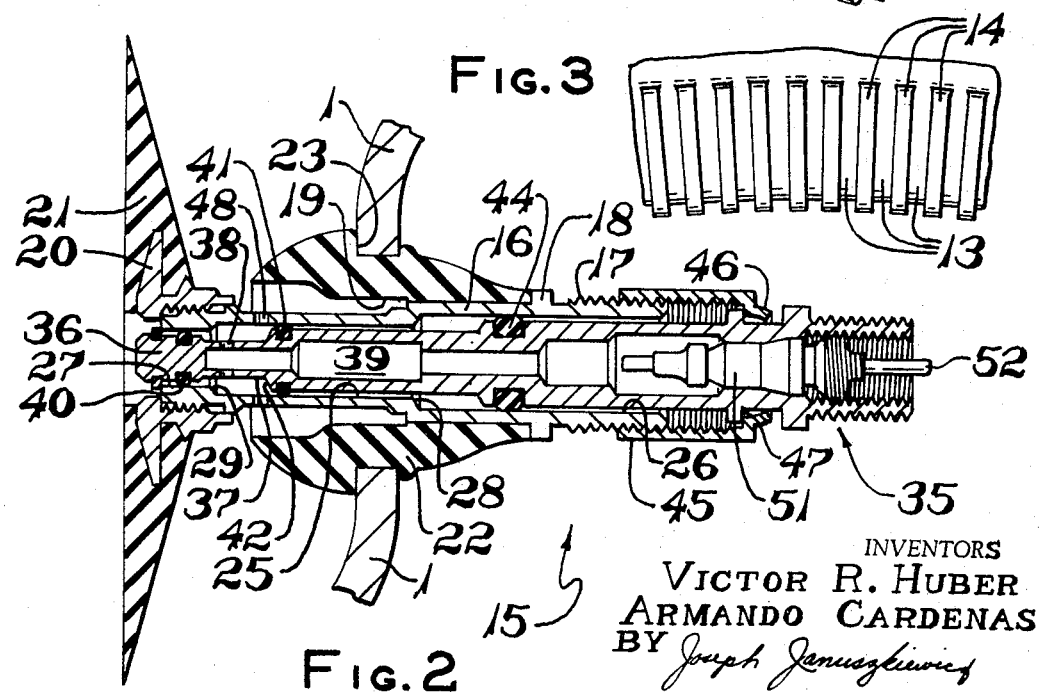
Fig. 2
Fig. 3
INVENTORS
VICTOR R. HUBER
ARMANDO CARDENAS
BY Joseph Januszkiewicz
ATTY.

INVENTORS
VICTOR R. HUBER
ARMANDO CARDENAS
BY Joseph Januszkiewicz
ATTY.

┌─────────────────────────────────────────┐
United States Patent Office             │
│                    3,476,168            │
│           Patented Nov. 4, 1969         │
└─────────────────────────────────────────┘

3,476,168
DUAL CHAMBERED TIRE VALVE
Victor R. Huber, Akron, and Armando Cardenas, Cuyahoga Falls, Ohio, assignors to The B. F. Goodrich Company, New York, N.Y., a corporation of New York
Filed May 23, 1967, Ser. No. 640,687
Int. Cl. B60c 29/00
U.S. Cl. 152—427                            8 Claims

ABSTRACT OF THE DISCLOSURE

A tire having an inner tire mounted in an outer tire with a valve that is operative to selectively connect the respective dual chambers defined by the rim that mounts the inner and outer tire to a pressure source.

---

Background of the invention

This invention relates to a tire and more particularly to a safety tire having an inner tire mounted in an outer tire and cooperative with a valve that facilitates separate inflation or deflation of the separate chambers or dual chambers formed by the outer tire, inner tire, and the rim which receives such tires.

In such dual chamber tires where such chambers are structurally separate, valve means must be provided to inflate such chambers separately. Although separate valves have been used for the separate inner and outer tires, such means is expensive and impractical as it requires special designed parts throughout. It has been proposed to use a valve structure that has two separate air valves operating through two separate air passages; however, the cost of such separate valves is relatively high, bulky and requires a redesign of the rim to a accommodate such change. A further means suggests the utilization of a valve structure that in one position provides communication to one chamber only and required removal of a portion of the valve and a reversal thereof to provide communication with the other chamber whereby only one chamber is able to be inflated at a time thereby consuming considerable time in adjusting the pressures in the respective chambers since they are interrelated and dependent.

The present invention provides a dual chamber tire having a valve that is economical to manufacture, simple and usable on the standard passenger car rim as well as on wide base truck, tractor or airplane tire rims facilitating the inflation and deflation of either chamber quickly and without difficulty while permitting the quick gauging thereof in the conventional manner. In addition such valve is designed to prevent accidental deflation through inadvertance with one end positively sealing the innermost chamber.

Brief summary of the invention

The present invention contemplates the use of an axially movable stem cooperative with an adjusting means relative to the body of the housing of the valve which selectively moves the stem for communication with spaced ports which provide selective inflation and deflation of the spaced chambers as defined by the outer tire, inner tire and rim.

Brief description of the drawings

FIG. 1 is a cross section of a safety tire embodying the invention.

FIG. 2 is a cross-sectional view on enlarged scale of the valve shown in FIG. 1.

FIG. 3 is a fragmentary view of the outer surface of one of the inner beaded edges of the inner tire.

Figure 4:
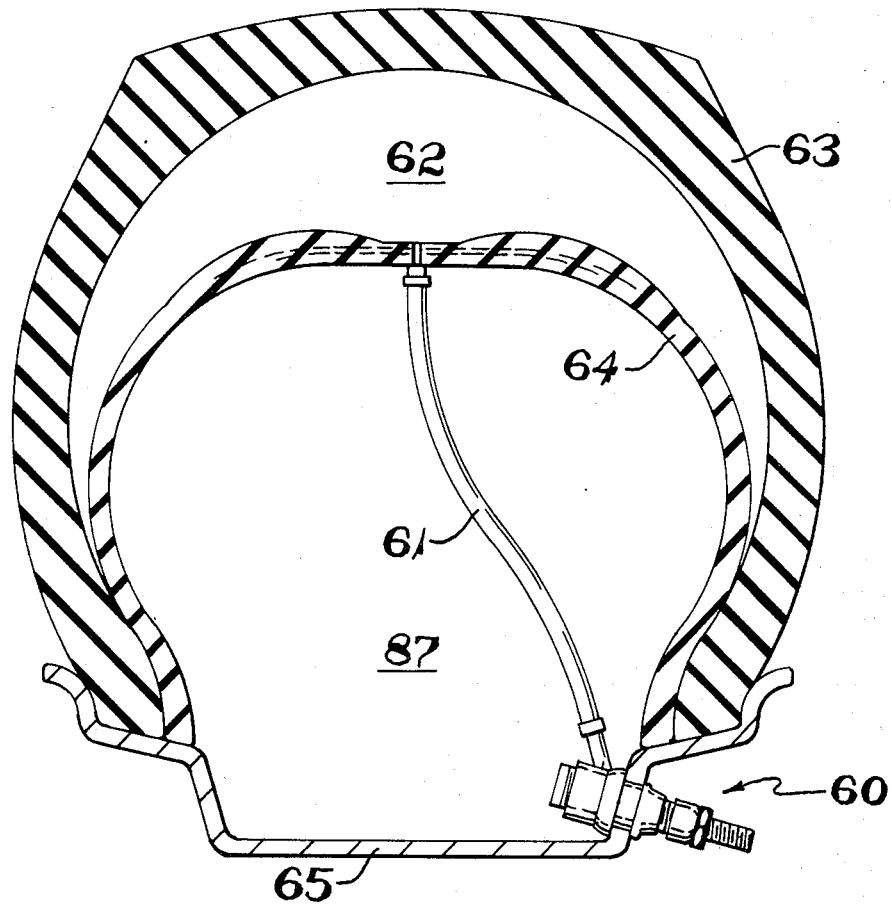
FIG. 4 is a cross-sectional view of a modified form of a safety tire embodying the invention.

Referring to the drawings and more particularly to FIG. 1 there is shown a tire rim 1 having spaced bead seats 2 with retaining flanges 3 adjacent thereto. A tubeless tire having an outer tire 5 with beads 6 is mounted on the rim 1 as shown. Located within the outer tire 5 is an inner tire 7 having beads 8 and reinforcing material such as fabric which extends from one end of the bead to the diametrically opposite bead end, and anchored thereto in a manner well known in the art. The outer edges of the inner tire 7 with the beads 8 are seated, on the bead seats 2 adjacent to the inner edges of the outer tire 5 containing the beads 6. An inner tube 12 may be located within the space defined by the inner tire 7 and the rim 1 or such tube 12 may be made integral with the tire 7.

As shown in FIGS. 1 and 3, the outer surfaces of the inner tire is provided with a series of parallel grooves 13 formed by spaced ribs 14 which extend under the beads and upwardly along the outer side wall surfaces of the inner tire 7 to permit the passage of air between the adjacent walls of the inner tire 7 and the outer tire 5 from a valve 15 in a manner to be described.

Valve 15 has an outer longitudinally extending tubular valve body 16 which has one end threaded exteriorly as at 17 with a circumferentially extending flange 18 adjacent thereto. The other end portion of valve body 16 is recessed as at 19 and threaded at the end portion thereof to receive a flanged nut 20 to which is bonded a conical rubber patch 21, which in turn is bonded to the inner tube 12. Although such tire valve 15 is shown as connected to an inner tire 7 with beads 8, it is to be understood that such valve is usable with a tape wound tire which does not require beads.

In order to provide a fluid leak-tight seal between the tire valve 15 and the rim a rubber grommet 22 suitably bonded to the valve body 16 is annularly recessed as at 23 to provide a seat for the rim 1. Other suitable means may be provided for securing such valve 15 to the rim 1. The bore extending longitudinally through the valve body 16 is stepped, having an intermediate bore portion 25 adjacent to spaced bore portions 26 and 27, providing a pair of spaced shoulders 28 and 29.

Slidably mounted within the bore of valve body 16 is a tubular valve member or stem member 35 having its one end portion exteriorly and interiorly threaded and the other end closed as at 36. Such other end portion has a recessed portion 37 with a plurality of circumferentially spaced radially extending passageways 38 which communicate such recessed portion 37 to an interior longitudinally extending passageway 39, which passageway 39 extends through the threaded one end portion of the tubular valve member or stem member 35 and is adapted to communicate with the atmosphere or with a suitable pressurized air source. Located at either side of the recessed portion 37 are raised portions which accommodate O-rings 40 and 41 whose outer edge portions engage the walls of the respective bores 27 and 25 to provide a fluid-tight seal therebetween. Recessed portion 37 adjacent to enlarged portion accommodating O-ring 41 terminates into a shoulder 42 which is adapted to abuttingly engage shoulder 29 on valve body 16.

An internally threaded knurled nut 45 threadedly mounted onto the threaded end 17 of valve body 16, has a downwardly extending flange portion 46 which is received by a recess 47 on the one end portion of tubular valve member or stem member 35, such that rotation of nut 45 is adapted to axially move tubular valve member 35 in the direction of rotation thereof. In the position shown in FIG. 2, passageway 38 of tubular valve member 35 is adapted to communicate a pressure source via passageway 39 and through the recessed portion 37 through a plurality of radially extending ports 48, past the clearance space between the grommet 22 and the valve body 16 to pressurize a chamber 49 defined by the outer tire 5 and the inner tire 7. Upon rotation of the nut 45 relative to the tubular valve member 35 and flanged end portion 46, nut 45 forces tubular valve member 35 in a leftward direction as viewed in FIG. 2 such that the O-ring 41 in cooperation with an O-ring 44 seals port 48 and connects passageway 39 through recess 37 past the end portion of the flanged nut 20 since the outer-most end portion of such tubular valve member 35 with its O-ring 41 extends beyond the outermost end portion of the bore 27 to provide sufficient clearance space therebetween to communicate such passageway 39 with a chamber 50 defined by the inner tire 7 and the rim 1. In such position O-rings 41 and 44 seal off chamber 49 as defined by such outer tire 5 and the inner tire 7 to maintain a preset pressure desired while permitting pressurization of chamber 50 to the desired pressure. O-ring 40 is located on the end portion of tubular valve member 35 such that it prevents the intercommunication of chamber pressures; however, if desired a pair of O-ring seals may be placed on such end portion to assure a positive seal and prevent intercommunication of pressures between the dual chambers past such end portion as tubular valve member 35 is moved axially.

Mounted within the outer end portion of passageway 39 and secured to the internally threaded portion of tubular valve member 35 is a conventional valve core 51, the outer end portion of which has a suitable stem 52 which controls the inflation of the respective chambers 49 and 50 via passageway 39. A removable valve cap 53 is mounted on a threaded end portion of tubular valve member 35 to protect such valve stem in a manner as is well known in the art.

From the foregoing detailed description it will be apparent that such valve, outer tire and inner tire provide a safety tire by which puncture of the outer tire casing provides sufficient pressure through the use of the inner tire to permit the operation of the vehicle a safe distance. Such valve permits the inflation and deflation as well as gauging of the respective tire chambers in a conventional manner in a simple and efficient manner without the requirement of the removal of the valve stem and repositioning thereof.

Such valve 15 is versatile in its use. Such valve 15 may utilize a conical rubber disc or patch which is adapted to be bonded to an inflatable tube, or such valve 15 may utilize a separate hose that is connectible to the threaded end portion of valve body 16 which as shown in FIG. 4 would be adaptable to inflate the outer chamber whereas the ports 48 would be adaptable to communicate with the inner chamber. Such illustrates the flexible use of valve 15.

In the operation of valve 15, assuming the valve in the position shown in FIG. 2, the operator removes valve cap 53 and pressurizes passageway 39 via a conventional pressure hose and nozzle wherein the stem 52 is depressed to control such inflation. Pressurized air flows from passageway 39 via passageways 38 and ports 48 past the clearance space between the grommet 22 and the valve body 16 as well as past the grooves 13 formed by the spaced ribs 14 to thereby inflate chamber 49 to the desired pressure. Gauging of chamber 49 may be done in the conventional manner. The operator then rotates knurled nut 45 such that tubular valve member 35 is moved in an axial direction such that O-ring 41 in cooperation with an O-ring 44 seals port 48 and connects passageway 39 through recess 37 past the end portion of the flanged nut 20 with chamber 50. Chamber 50 may be gauged, inflated or deflated without affecting the pressure in chamber 49. As a further example of the versatility of such safety tire, assume that chamber 49 is pressurized by approximately 24 p.s.i. with chamber 50 pressurized to 40 p.s.i. The outer tire 5 will provide the softer ride and upon puncture of such outer tire, chamber 50 via inner tire 12 will maintain the outer tire in running condition and will further maintain sufficient pressure on the sidewalls thereof to prevent collapse.

Figure 5:
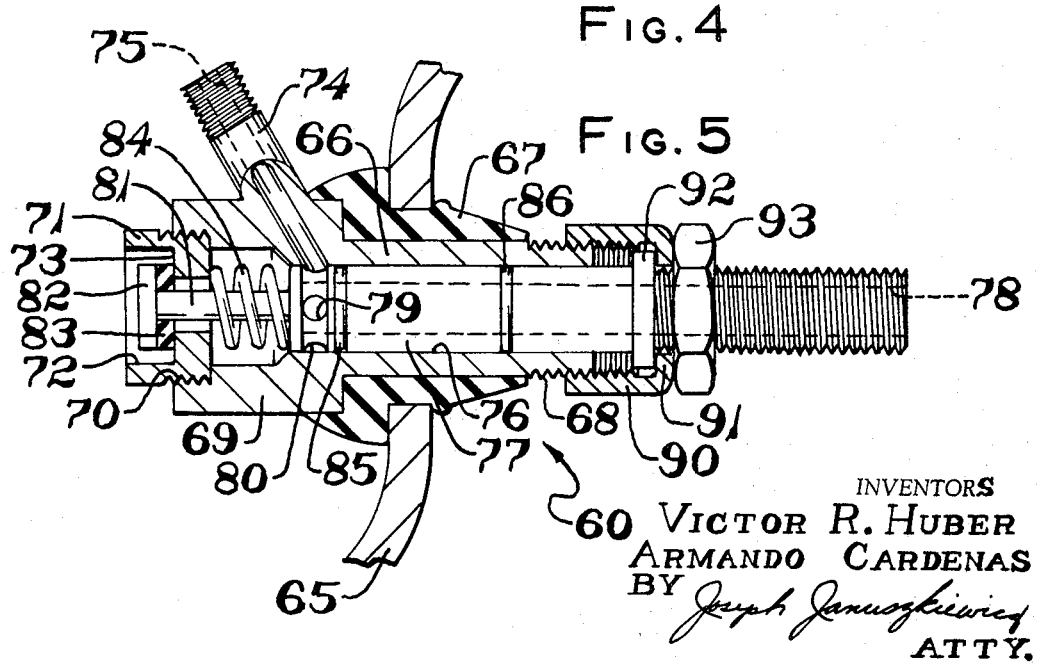
FIG. 5 is a cross-sectional view of the modified form of valve shown in FIG. 4.

A modification of the tire valve is shown in FIGS. 4 and 5 wherein such tire valve 60 is connected via a hose 61 to supply pressurized air to a chamber 62 as defined by an outer tire 63 and an inner tire 64. Such tires 63 and 64 are mounted onto a rim 65 in the same manner as described in the original embodiment of FIGS. 1 and 2.

The valve 60 comprises a longitudinally extending valve body 66 that is secured by an annular molded rubber grommet 67 to the rim 65 of the tire assembly. The one end portion of valve body 66 is threaded as at 68 while the other end portion is enlarged as at 69. Enlarged end portion 69 has an internally threaded portion 70 which receives a threaded annular flange member 71 which is recessed on the outer end portion as at 72 to provide a shoulder 73 for a purpose to be described. Enlarged end portion 69 has an outwardly extending projection 74 having a passageway 75 extending longitudinally therethrough which communicates with the central passageway 76 that extends through such valve body 66.

Slidably mounted within valve body 66 is a valve stem or tubular valve member 77 having a bore 78 that extends substantially through the entire length of such valve stem communicating via a port 79 and external annular recess 80 to the passageway 75 in the outwardly extending projection 74 of valve 66. Valve stem or tubular valve member 77 has a reduced end portion 81 that terminates into an enlarged portion 82, which enlarged end portion 82 cooperates with a valve seal 83 to provide a positive seal when it abuttingly engages shoulder 73. A spring 84 encompasses the reduced end portion 81 of valve stem 77 to bias such valve stem rightwardly as viewed in FIG. 5, thereby seating the valve seal against shoulder 73. The intermediate portion of valve stem 77 has a pair of spaced O-rings 85 and 86, with O-ring 85 mounted closely adjacent to the port 79 whereby such O-ring 85 cooperates with the valve seal 83 in the position shown in FIG. 5 to provide a fluid-tight seal for pressurized air in chamber 62 which communicates therewith via passageway 75. Upon leftward movement of the valve stem 77 relative to the valve body 66, O-rings 85 and 86 provide a fluid-tight seal for such chamber 62 wherein port 79 provides open communication to a chamber 87 as defined by the inner tire 64 and the rim 65 whereby pressurized fluid from a suitable source may communicate with such chamber 87 through the bore 78, port 79, past the reduced end portion 81 of valve stem 77 and past the valve seal 83. Knurled cap 90 is threadedly mounted on the valve body 66 having its inwardly extending annular flange portion 91 secured between an enlarged portion 92 on the valve stem 77 and a hex-lock nut 93, which nut 93 is threadedly mounted on the threaded end portion of valve stem 77. Rotation of knurled cap 90 effects axial movement of the valve stem 77 to selectively control the inflation of chamber 62 or 87. Mounted within the outer end portion of bore 78 is a conventional valve core which permits controlled inflation and deflation of the bore 78 via a conventional pressure hose as is common and well known in the art.

In the operation of the valve stem pressurized air via bore 78 through the conventional valve core pressurizes chamber 62 via ports 79, and flows via passageway 75 through the hose 61 to the chamber 62. Such chamber 62 may be inflated to the desired pressure, gauged and if desired deflated in the same manner via the conventional valve core. Upon rotation of knurled cap 90, valve stem or tubular valve member 77 is moved in an axial direction to the left as viewed in FIG. 5 to move the enlarged portion 82 along with valve seal 83 outwardly away from shoulder 73 and thereby provide communication between chamber 87 and the clearance space between reduced portion 81 and the flanged member 71 whereby pressurized air from a suitable source is introduced into bore 78 through the conventional valve core with such pressurized air flowing through ports 79 into chamber 87. O-rings 85 and 86 maintain a positive seal with respect to chamber 62 during such operation. Upon reverse rotation of knurled caps 90 to move valve stem 77 in an axial direction to the right as viewed in FIG. 5, spring 84 will bias the valve stem 77 outwardly to the right into the position shown in FIG. 5 upon sufficient rotation of cap 90.

It should be understood of course that the foregoing disclosure relates to only preferred embodiments of the invention and that numerous modifications or alterations may be made therein without departing from the spirit and the scope of the invention as set forth in the appended claims.

What is claimed is:

1. A tire valve for use in inflating an inner chamber and an outer chamber comprising a valve body, said valve body having an intermediate portion adapted to be mounted in an opening in the rim carrying the tire, said body having a passageway extending longitudinally therethrough, said passageway having a one end portion, said valve body adjacent to said one end portion of said passageway being threaded, the other end portion of said passageway opening into communication with one of said chambers, the other end portion of said valve body having a port communicating with the other of said chambers, a valve member mounted in said passageway for axial movement therein, said valve member having a central bore therein extending from one closed end thereof through the other end portion of said valve member, said other end portion of said valve member having a valve core for controlling the pressurization of said bore, a collar threadedly mounted on said threaded end portion of said valve body, said collar having a flanged portion received by a recess in said valve member, said valve member having a radially extending port adjacent said one closed end, a pair of annular O-rings carried peripherally by said valve member, one of said O-rings located on said valve member between said port on said valve member and said closed end of said valve member, the other of said pair of O-rings located on said valve member between said port on said valve member and the intermediate portion of said valve member, an O-ring carried by the peripheral intermediate portion of said valve member for contact with said passageway, said valve member operative to communicate said port in said valve member with said port in said valve body and wherein said pair of O-rings abuttingly contact peripheral portions of said passageway on either side of said port in said valve body, and said collar operative upon rotation thereof to communicate said port of said valve member with said other end portion of said passageway with said other one of said pair of O-rings cooperative with said O-ring carried by said intermediate portion to seal off said port of said valve body.

2. A safety tire having an outer tire member and an inner tire member mounted therein, said inner and outer tire members being mounted onto a vehicle rim to define a pair of closed chambers, a valve member attached to said rim, said valve member having a valve body, said valve body having spaced bores on one end portion thereof, one of said bores communicating with one of said chambers and the other of said bores communicating with the other of said chambers, a tubular valve member with a central passageway therethrough mounted in said valve body for movement therein, one end portion of said passageway having a valve core mounted therein to control the passage of air through said central passageway, control means mounted on said valve member and connected to said tubular valve member operative to move said tubular valve member to selectively communicate said first chamber or said second chamber with said passageway for de-pressurization or pressurization of said corresponding chamber from said passageway.

3. A safety tire having an outer tire member and an inner tire member mounted therein; said inner and outer tire members being mounted onto a vehicle rim to define a pair of closed chambers; a tire valve extending through said rim and attached to said inner tire and attached to said rim; said tire valve having a valve body; said valve body having first opening means on one end portion thereof communicating with one of said chambers and second opening means at said one end for communicating with the other of said chambers; a tubular valve member slidably mounted in said valve body; one end portion of said tubular valve member having a valve core mounted therein to control the passage of air therethrough; said tubular valve member having a radially extending passageway communicating through said first opening means to said one chamber; a control member mounted on said valve body and operatively connected to said tubular valve member to move said tubular valve member axially between a first position and a second position to selectively provide communication between said passageway and said first or said second opening means, said tubular valve member in said first position being operative to connect said passageway through said first opening means to said one chamber, said tubular valve member in said second position being operative to connect said passageway through said second opening means to said other chamber.

4. A safety tire as set forth in claim 3 wherein said other end of said tubular valve member has a reduced end portion with an enlarged end operative to abuttingly engage a shoulder on said valve body to prevent removal of said tubular valve member through said bore past the other end portion of said valve body.

5. A safety tire as set forth in claim 4 wherein said enlarged end has a sealing means thereon, spring biasing means urging said tubular valve member into said second position wherein said sealing means closes off said opening.

6. A safety tire as set forth in claim 5 wherein a hose operatively interconnects said first opening means with said one chamber.

7. A tire valve for use in inflating an inner chamber and an outer chamber comprising a valve body for mounting onto a tire rim, said valve body having a bore extending longitudinally therethrough, said opening in said valve body being at one end of said valve body and being a portion of said bore, said valve body having a port and an opening at one end therof communicating with said bore and wherein said port communicates with one of such chambers and said opening communicates with the other of such chambers; a tubular valve member being slidably mounted in said valve body for reciprocal movement therein; one end portion of said tubular valve member having a valve core mounted therein to control the inlet and outlet of air therethrough; the other end portion of said tubular valve member having a laterally extending passageway communicating through said port to said one chamber; a control member mounted on said valve body and operatively connected to said tubular valve member to move said tubular valve member axially between a first position and a second position to selectively provide communication between said passageway and said opening or said port, said tubular valve member in said first position being operative to connect said passageway through said port to such one chamber, said tubular valve member in said second position being operative to connect said passageway through said opening to such other chamber.

8. A tire valve for use in inflating an inner and an outer chamber comprising a valve body attachable to a tire rim, said valve body having a central bore, a tubular valve member slidably mounted within said bore of said valve body; said valve body having a pair of axially spaced openings; said tubular valve member having a central passageway; said tubular valve member having a lateral extending port leading from said central passageway outwardly therefrom for communication with said bore of said valve body; control means located on one end of said valve body and connected to said tubular valve member for axially moving said valve stem relative to said valve body to establish fluid communication between said port and one or the other of said openings in said valve body; and said tubular valve member having a pair of spaced O-rings axially to one side of said port and an O-ring axially to the other side of said port said O-rings operative to maintain a fluid-tight seal between said openings and said one end of said valve body at all times during axial movement of said valve stem, with said port being operative to establish communication between one or the other of said openings.

References Cited

UNITED STATES PATENTS

| | | |
|---|---|---|
| 3,065,763 | 11/1962 | Howard. |
| 2,991,821 | 7/1961 | Williams _____ 152—427 |
| 3,361,153 | 1/1968 | Krohn et al. _____ 152—427 X |

ARTHUR L. LA POINT, Primary Examiner

U.S. Cl. X.R.

137—234.5